US007364820B2

(12) United States Patent
Tanaka et al.

(10) Patent No.: US 7,364,820 B2
(45) Date of Patent: Apr. 29, 2008

(54) CARD CONNECTOR

(75) Inventors: Akihiro Tanaka, Osaka (JP); Yasuo Nakai, Osaka (JP); Tsuyoshi Kitagawa, Osaka (JP)

(73) Assignee: Hosiden Corporation, Yao-shi, Osaka (JP)

( * ) Notice: Subject to any disclaimer, the term of this patent is extended or adjusted under 35 U.S.C. 154(b) by 0 days.

(21) Appl. No.: 11/604,308

(22) Filed: Nov. 27, 2006

(65) Prior Publication Data

US 2007/0128943 A1 Jun. 7, 2007

(30) Foreign Application Priority Data

Dec. 6, 2005 (JP) ............................ 2005-351884

(51) Int. Cl.
*H01R 24/00* (2006.01)

(52) U.S. Cl. ...................................... 429/633; 439/630

(58) Field of Classification Search ................ 439/630, 439/633

See application file for complete search history.

(56) References Cited

U.S. PATENT DOCUMENTS 6,068,516 A * 5/2000 Chang ........................ 439/633
6,394,827 B2 * 5/2002 Nogami ...................... 439/159
6,503,092 B1 * 1/2003 Sato .......................... 439/159
6,814,596 B2 * 11/2004 Yu et al. ..................... 439/159
6,840,807 B2 * 1/2005 Ooya et al. ................. 439/630
6,851,959 B2 * 2/2005 Ooya et al. ................. 439/159
6,951,471 B1 * 10/2005 Chen .......................... 439/159
6,966,786 B1 * 11/2005 Motojima et al. .......... 439/159
7,118,397 B1 * 10/2006 Su et al. ..................... 439/159
2005/0230474 A1 10/2005 Matsumoto

FOREIGN PATENT DOCUMENTS

EP 1 193 807 A2 4/2002
EP 1 600 879 A2 11/2005
JP 2001-160458 6/2001
JP 2001-167232 6/2001
JP 2001-244026 9/2001
JP 2003-217741 7/2003
JP 2004-185971 7/2004
JP 2005-100836 4/2005
WO WO 2004/063972 A1 7/2004

* cited by examiner

*Primary Examiner*—Tulsidas C. Patel
*Assistant Examiner*—Harshad C Patel
(74) *Attorney, Agent, or Firm*—Bacon & Thomas, PLLC

(57) ABSTRACT

The invention relates to a card connector. On one side of a housing 11 into which a card 1 having a cutaway portion 2 on one end side of a tip end is to be inserted, the card connector has a sliding member 50 which has a projecting portion 51 to be fitted into the cutaway portion 2 of the card 1, and which is movable in a card insertion/extraction direction. Erroneous insertion preventing means into which, when the card 1 is erroneously inserted in an inverted surface and rear face relationship and inclined so as to eliminate a gap which is formed by the cutaway portion 2 of the card 1 positioned in a side in the housing 11 opposite to the sliding member 50, an edge of a tip end portion of the card 1 on the side of the cutaway portion 2 is fitted to block insertion of the card 1 is disposed at a position on a side face portion 33 of the housing 11 opposite to the sliding member 50, the position being close toward a card insertion port 10.

7 Claims, 8 Drawing Sheets

10
11
20
21
24
25
25
26
26
30
31
33
34
34
35
37
(35)
40
40
41
41
72

23
30
20
21
31
42
40
11
33
37
(35)
41
1

CARD CONNECTOR

BACKGROUND OF THE INVENTION

1. Field of the Invention

The present invention relates mainly to a card connector which is to be mounted in a small electronic apparatus such as a portable telephone.

2. Description of the Prior Art

For a memory card having a cutaway portion in one side of the tip end, conventionally, a card connector with a push-push type ejection mechanism is known. On one side of a housing into which such a card is to be inserted, the card connector comprises a sliding member which has a projecting portion to be fitted in the cutaway portion of the card, and which is movable in the card insertion/extraction direction. When the card is normally inserted, the projecting portion of the sliding member is fitted into the cutaway portion of the card, thereby causing the card to push the sliding member in a state where a tip end portion is fitted between the projecting portion of the sliding member and a side face portion of the housing opposite to the sliding member. Therefore, the card can be inserted to a predetermined attachment position. By contrast, when the card is erroneously inserted in an inverted front and back or surface and rear face relationship, an edge of the tip end potion of the card other than that of the cutaway portion interferes with the projecting portion of the sliding member, thereby causing the card to push the sliding member in a state where the tip end portion is not fitted between the projecting portion of the sliding member and the side face portion of the housing opposite to the sliding member. Therefore, the card cannot be inserted to the predetermined attachment position (for example, see paragraphs 0019 and 0020, and FIGS. 9 and 10 of Japanese Patent Application Laying-Open No. 2005-100836).

SUMMARY OF THE INVENTION

When the card is erroneously inserted in an inverted surface and rear face relationship, the card is sometimes inclined so as to eliminate a gap which is formed by the cutaway portion of the card positioned in the side opposite to the sliding member in the housing. In this case, if the operation of inserting (pushing) the card is stopped at the moment when the card is inclined, there occurs no problem. However, this is hardly performed. Usually, the card is further inserted while maintaining the inclined state. Therefore, the card bites into the housing in a state where the edge of the tip end portion of the card on the side of the cutaway portion is pressed against the side face portion of the housing opposite to the sliding member, and a side face portion of the card opposite to the cutaway portion is pressed against an opening edge of a card insertion port of the housing on the side of the sliding member. In some cases, even a side face portion of the card on the side of the cutaway portion is pressed against an opening edge of the card insertion port of the housing opposite to the sliding member, and the card bites also into the card insertion port of the housing. When this situation occurs, the card and the card connector are damaged. Moreover, in the case where the card is small, when the card bites into the housing, it is very difficult to pull out the card because the card is projected from the housing by a small area.

The problem to be solved by the invention is as follows. The erroneous insertion preventing means of the conventional art is configured so that, when a card is erroneously inserted into the housing, it blocks insertion of the card to the attachment position. Therefore, the means cannot prevent erroneous insertion in which a card is inclined and bites into a housing in an initial stage of the card inserting process, from occurring.

In order to solve the problem, the invention provides a card connector wherein, on one side of a housing into which a card having a cutaway portion on one end side of a tip end is to be inserted, the card connector comprises a sliding member which has a projecting portion to be fitted into the cutaway portion of the card, and which is movable in a card insertion/extraction direction, and erroneous insertion preventing means for, when the card is erroneously inserted in an inverted surface and rear face relationship and inclined so as to eliminate a gap which is formed by the cutaway portion of the card positioned in a side in the housing opposite to the sliding member, engaging with an edge of a tip end portion of the card on a side of the cutaway portion to block insertion of the card is disposed at a position on a side face portion of the housing opposite to the sliding member, the position being close toward a card insertion port. Even when a card is erroneously inserted in an inverted surface and rear face relationship, the erroneous insertion preventing means blocks insertion of the card in an initial stage of the card inserting process, and therefore the card can be prevented from biting into the housing.

According to the invention, even when a card is erroneously inserted in an inverted surface and rear face relationship and inclined, the card does not bite into the housing, and damages caused on the card and the card connector can be suppressed to a minimum level. Furthermore, the card can be easily pulled out from the housing.

DETAILED DESCRIPTION OF THE PREFERRED EMBODIMENT

Figure 8C:
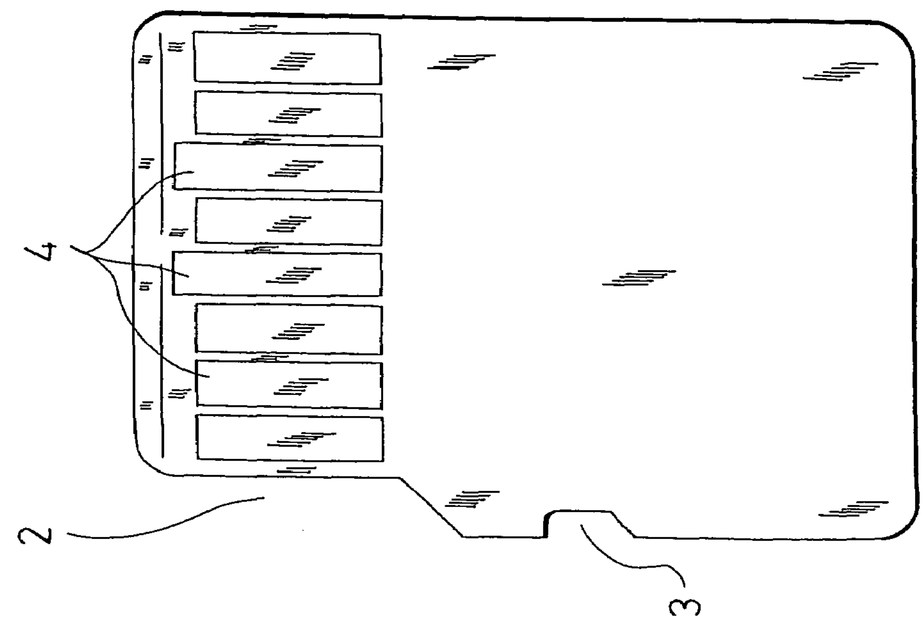
FIG. 8C is a rear view.
Figure 8B:
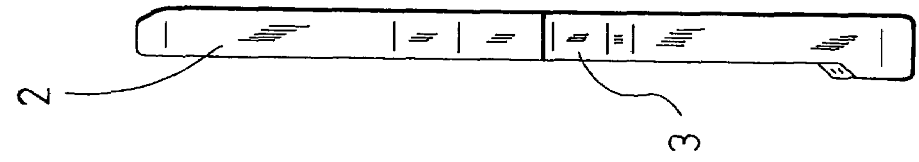
FIG. 8B is a side view.
Figure 8A:
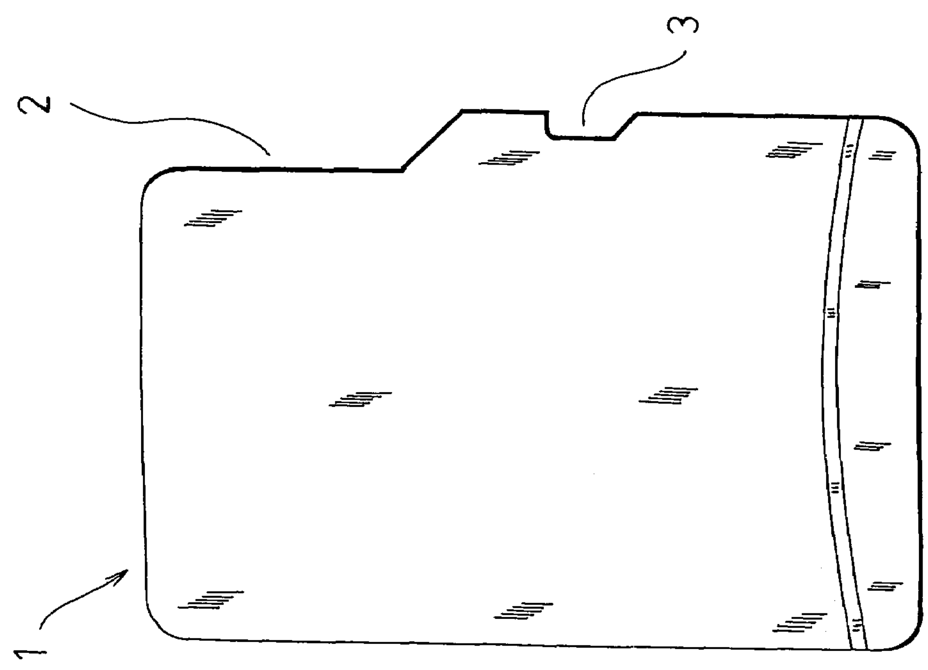
FIG. 8A is a front view showing a card to be used in the card connector of the embodiment of the invention.

Hereinafter, an embodiment of the invention will be described with reference to the accompanying drawings. FIG. 8A is a front view showing a memory card (hereinafter, referred to as "card") to be used in the card connector of the embodiment of the invention, FIG. 8B is a side view, and FIG. 8C is a rear view. As shown in FIG. 8, the card 1 is well-known as "TRANSFLASH (registered trademark)" or "MICRO SD CARD (registered trademark)", and has a cutaway portion 2 for preventing erroneous insertion, in one side of the tip end, and an engagement groove 3 for half-locking, in a side face portion in front of the cutaway portion 2. The cutaway portion 2 is shaped not by removing away a triangular edge portion of one side of the tip end portion of a rectangular card by a flat plane, but by re-moving a tetragonal portion of one side of the tip end por-tion of a rectangular card by two planes or one plane which includes an edge, and which is parallel to the opposite side face, and another face which obliquely intersects with the one plane. As a result, a side edge of the card 1 on the side of the cutaway portion 2 is formed into a stepped shape, so that the width (lateral width) of a tip end por-tion having the cutaway portion 2 on one side is smaller than the width (lateral width) of a portion in front of the cutaway portion 2. Plural connecting terminals 4 are jux-taposed on the rear face of the small-width tip end portion of the card 1.

Figure 1:
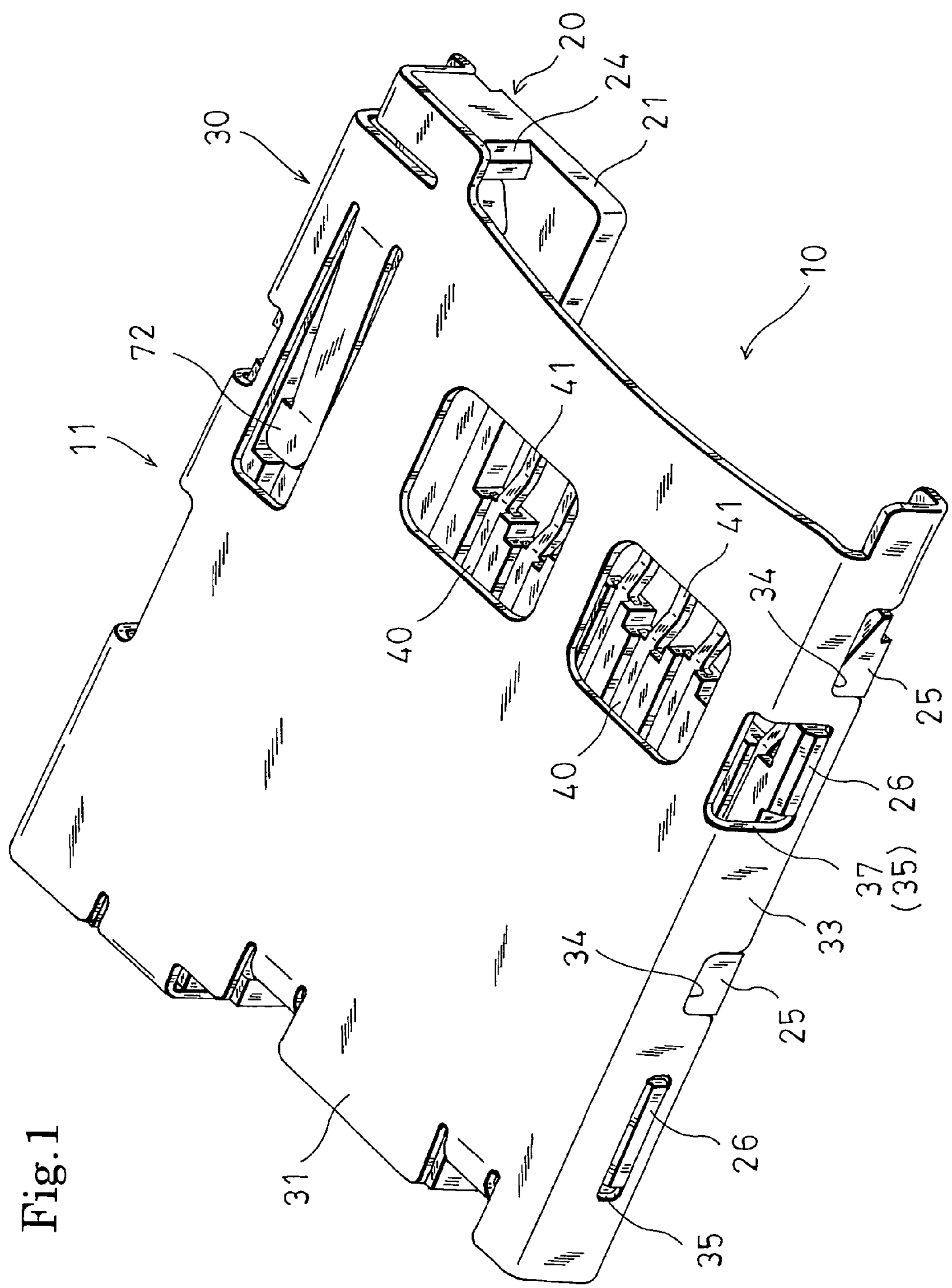
FIG. 1 is a perspective view showing the appearance of a card connector of an embodiment of the invention.
Figure 2:
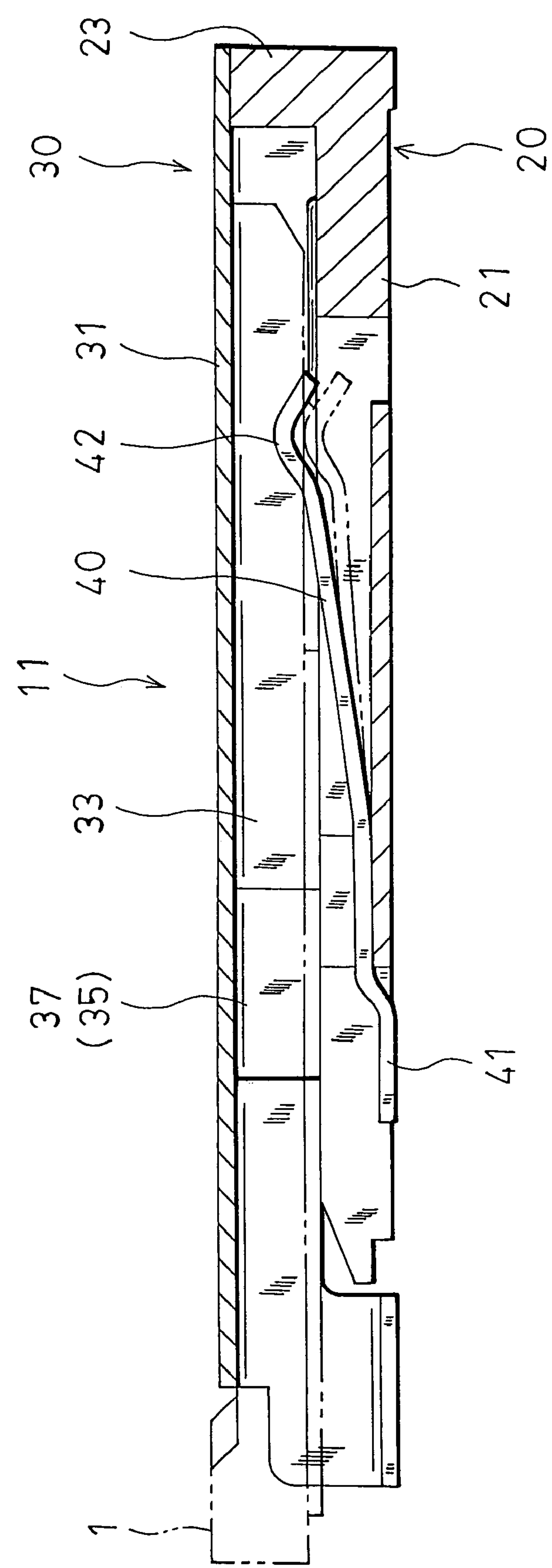
FIG. 2 is a section view showing the internal structure of the card connector of the embodiment of the invention.
Figure 3:
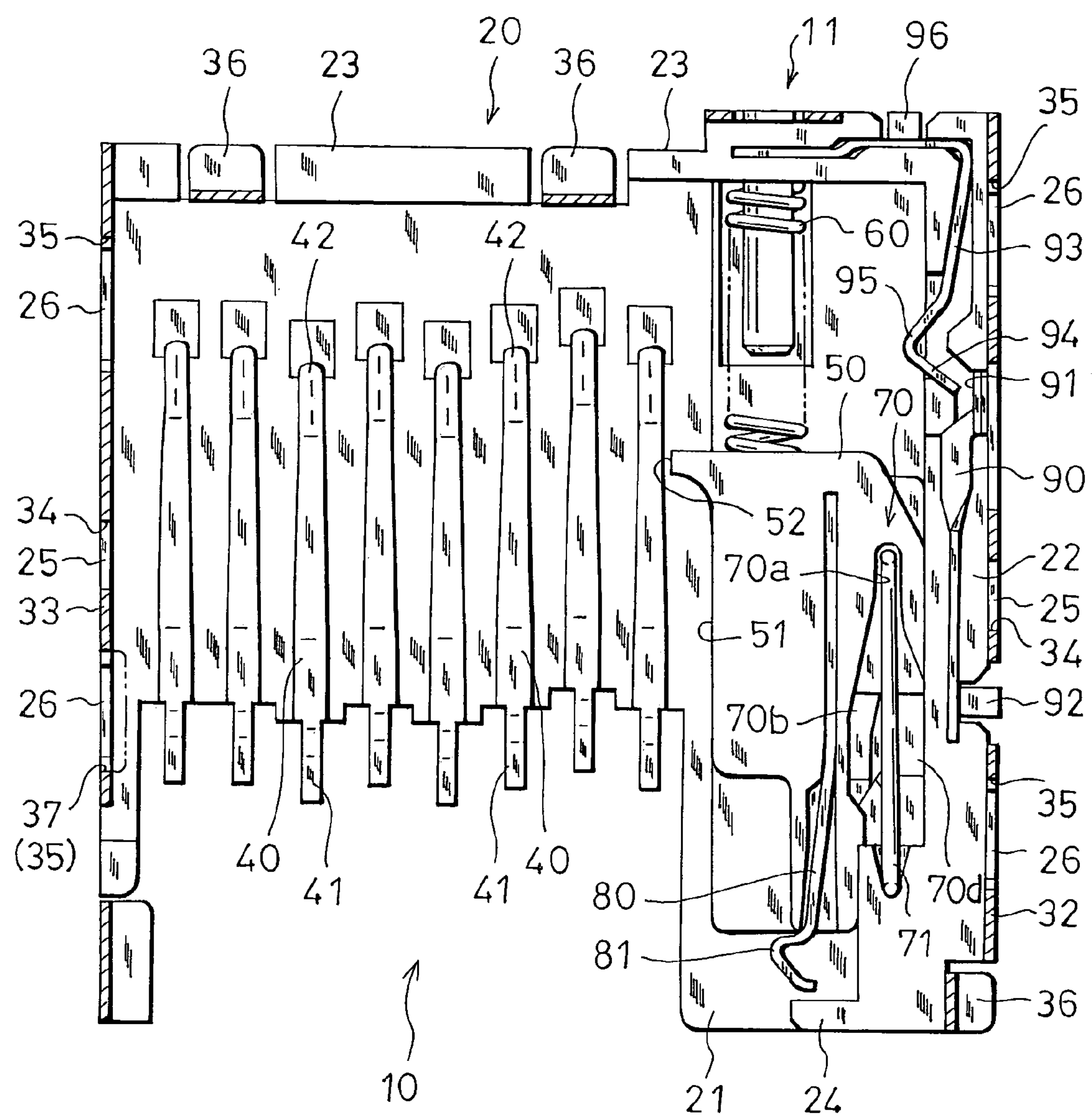
FIG. 3 is a plan view showing the internal structure of the card connector of the embodiment of the invention.

FIG. 1 is a perspective view showing the appearance of the card connector of the embodiment of the invention, FIG. 2 is a section view showing the internal structure of the card connector of the embodiment of the invention, and FIG. 3 is a plan view showing the internal structure of the card connector of the embodiment of the invention. As shown in FIGS. 1 to 3, the card connector comprises a card insertion port 10 which is opened with being shifted toward the left side of the front side face, and a thin rectangular box-like housing 11 into which the card 1 can be inserted through the card insertion port 10. The housing 11 is configured by a resin-made housing body 20, and a cover 30 which is formed by a metal plate, and which covers the housing body 20 from the upper side. In the housing 11, a bottom face portion, a right side face portion, a rear side face portion, and a front side face portion which is on the right side of the card insertion port 10 are made of a resin and configured by a bottom plate portion 21, a right side wall portion 22, a rear side wall portion 23, and a front side wall portion 24 which are molded integrally with the housing body 20, and a top face portion, a cover por-tion of the right side face portion, and a left side face portion are made of a metal and configured by a top plate portion 31, a right side face cover portion 32, and a left side wall portion 33 which are formed integrally with the cover 30.

In order to perform positioning of the cover 30 with respect to the housing body 20, projections 25 having a thickness which is approximately equal to that of the cover 30 are disposed on the outer side face of the right side wall portion 22 and the left end face of the bottom plate portion 21, and notches 34 which are downward opened, and which are respectively fitted to projections 25 from the upper side are disposed in the right side face cover portion 32 and the left side wall portion 33. In order to fix the cover 30 to the housing body 20, engagement claws 26 which are protruded at a thickness that is approximately equal to that of the cover 30 are disposed on the outer side face of the right side wall portion 22 and the left end face of the bottom plate portion 21, and engagement holes 35 each of which is formed by a through hole, and into which the engagement claws 26 are fitted are opened in the right side face cover portion 32 and the left side wall portion 33. Plural legs 36 which are exposed so as to be substantially flush with the rear face (lower face) of the bottom plate portion 21, and which are to be soldered to a circuit board (not shown) constituting an apparatus-side electronic circuit are disposed on the cover 30.

In an inner portion of the housing 11, plural cantilevered contacts 40 for electrically connecting the apparatus-side electronic circuit with an electronic circuit incorporated in the card 1 are juxtaposed. Each of the contacts 40 is formed by a narrow metal thin plate which is electrically conductive. One end side of the contact is fixed and supported by press fitting into the bottom plate portion 21 or insert molding therewith, and the other end side is projected in a vertically elastically displaceable manner in the upper side of the bottom plate portion 21. In each of the contacts 40, a stationary end portion is exposed so as to be substantially flush with the rear face of the bottom plate portion 21 and formed as a leg 41 which is to be soldered to the circuit board, and a free end portion is formed as an arcuate contact portion 42 which is to be contacted with respective one of the contact terminals 4 of the card 1.

A resin-made sliding member 50 which is movable in the card insertion/extraction direction (anteroposterior direc-tion) is disposed in the internal right side of the housing 11. In the sliding member 50, the lower face is slidably sup-ported on the surface (upper face) of the bottom plate portion 21, and the right side face is slidably supported on the inner side face of the right side wall portion 22, so that the sliding member is guided in the card insertion/extraction direction. The sliding member 50 has: a projecting portion 51 which is formed on the left side face opposed to the left side wall portion 33, and which is to be fitted into the cutaway portion 2 of the card 1; and a receiving portion 52 which is further protruded from a rear end portion of the projecting portion 51 toward the left side, and against which the tip end face of the card 1 is to butt.

The sliding member 50 constitutes a push-push type ejection mechanism, and is always urged in the card ejection direction (forward direction) by a coil spring 60 which is disposed between the sliding member 50 and the rear side wall portion 23. A heart-shaped cam groove 70 is formed in the sliding member 50. A cam pin 71 is formed by a thin metal rod in which both end portions are bent at a right angle in one direction. In the cam pin, a one-end bent portion is supported on the right side wall portion 22 so as to be laterally swingable about its axis, and an other-end portion is slidably fitted into the cam groove 70 of the sliding member 50. A plate spring 72 which always downward urges the cam pin 71 is formed by a part of the top plate portion 31. In the plate spring, a one-end bent portion is fitted and held by a bearing hole of the right side wall portion 22, and an other-end bent portion by the cam groove 70. A half-lock spring 80 which is configured by a cantilevered beam-like plate spring is disposed in the sliding member 50. In the half-lock spring 80, one end is fixed and supported by the sliding member 50, and the other end is extended toward the front of the projecting portion 51 so as to be laterally elastically displaceable. A chevron-shaped engagement por-tion 81 which is projected toward the left side, and which is to be fitted into the engagement groove 3 of the card 1 is formed in the free end portion of the half-lock spring 80. The push-push type ejection mechanism is configured by: the sliding member 50 which is caused to engage with the card 1 that is to be inserted into the housing 11 by an engagement member formed by the half-lock spring 80 and the like, and which is movable in the insertion/extraction direction of the card 1; an urging member which is formed by the coil spring 60 for always urging the sliding member 50 in the card ejection direction, and the like; and a cam mechanism which is formed by the heart-shaped cam groove 70, the cam pin 71, and the like, and which has a locking function of, against the urging member, holding the sliding member 50 to a predetermined attachment position of the card 1 by a first pushing operation on the card 1, and a lock canceling function of canceling the locking by a second pushing operation on the card 1. In the push-push type ejection mechanism, when the card 1 is not inserted, as shown in FIG. 3, the sliding member 50 is moved to the initial position which is a movement end position in the card ejection direction, and restored and held to a state where the other-end bent portion of the cam pin 71 is fitted into a one-end starting portion 70*a* of the cam groove 70, or the initial state.

The housing 11 comprises a stationary contact piece 90 and a movable contact piece 93 which constitute a card attachment state detection switch. The stationary contact piece 90 is formed by an electrically conductive metal thin plate. One end side is fixed and supported by press fitting or insert molding with the right side wall portion 22, and the other end is exposed from a rear portion of the inner side face of the right side wall portion 22 to the inside of the housing 11, so as to be formed as a stationary contact portion 91. The movable contact piece 93 is formed by an electrically conductive metal thin plate. One end side is fixed and supported by press fitting or insert molding with the edge between the right side wall portion 22 and the rear side wall portion 23, and the other end is extended inside the stationary contact portion 91 in a laterally elastically displaceable manner, so as to be formed as a movable contact portion 94 which can be contacted with and separated from the stationary contact portion 91. A free end portion including the movable contact portion 94 of the cantilevered movable contact piece 93 is formed as a chevron-shaped operating portion 95 in which a top portion is extended to the movement region of the sliding member 50, and a free side portion of the movable contact piece 93 is elastically displaced toward the outside (right side) by the sliding member 50 held to the predetermined attachment position so that the movable contact portion 94 is contacted with and held to the stationary contact portion 91. The contact pieces 90, 92 are provided with legs 92, 96 which are exposed so as to be substantially flush with the rear face of the bottom plate portion 21, and which are to be soldered to the circuit board.

Figure 7:
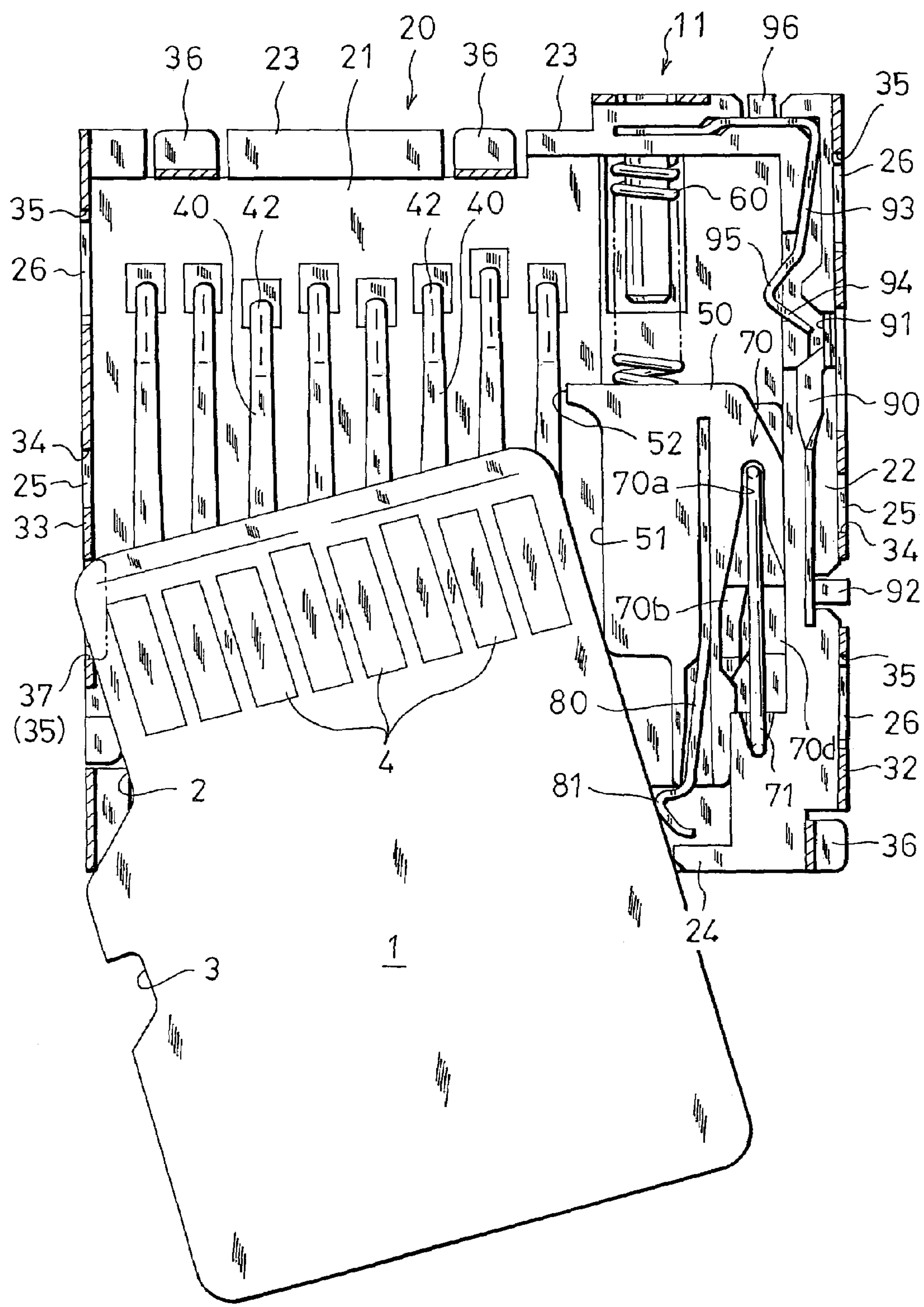
FIG. 7 is a plan view showing an initial insertion state in the case where a card is erroneously inserted in an inverted surface and rear face relationship into the card connector of the embodiment of the invention.

A through hole 37 into which the edge of the tip end portion of the card 1 on the side of the cutaway portion 2 is to be fitted is opened at a position which is in a side face portion of the housing 11 opposite to the sliding member 50, and which is close to the card insertion port 10, or namely at a position which is in the front side of the left side wall portion 33 and near the front side (see FIG. 7). The through hole functions as erroneous insertion preventing means for, when the card 1 is erroneously inserted in an inverted surface and rear face relationship and inlined so as to eliminate a gap which is formed by the cutaway portion 2 of the card 1 positioned in the side opposite to the sliding member 50 in the housing 11, engaging with an edge of the tip end portion of the card 1 on the side of the cutaway portion 2 to block insertion of the card 1. The through hole 37 is opened so that the upper portion extends into the top plate portion 31, and the lower portion extends into the left side end face of the bottom plate portion 21, thereby allowing the edge of the tip end portion of the card 1 on the side of the cutaway portion 2 to be smoothly fitted into the hole. The engagement claw 26 which is fitted into a lower portion of the through hole 37 is disposed in the left side end face of the bottom plate portion 21, so that the through hole 37 functions also as the engagement hole 35 for fixing the cover 30 to the housing body 20.

The thus configured card connector is used in a state where the card connector is surface-mounted on the circuit board, and the legs 36 of the cover 30, the legs 41 of the contacts 40, and the legs 92, 96 of the contacts 90, 93 are soldered and fixed to predetermined lands of the circuit board, and electrically connected thereto. All or some of the legs 36 of the cover 30 are soldered to grounding lands of the circuit board, so that static electricity of a person escapes through the cover 30 to the ground, thereby preventing various electronic components and the like mounted on the circuit board from being electrostatically broken down.

Next, an operation in the case where the card 1 is inserted into the thus configured card connector will be described. First, the case where, when the card 1 is normally inserted or namely when, while the rear face of the card 1 is downward directed, the card is inserted through the card insertion port 10 into the interior of the housing 11 with starting from the small-width tip end portion of the card 1 will be first described. Then, the case where, when the card 1 is erroneously inserted or inserted in an inverted surface and rear face relationship, or namely when, while the rear face of the card 1 is upward directed, the card is inserted through the card insertion port 10 into the interior of the housing 11 with starting from the small-width tip end portion of the card 1 will be described.

Figure 4:
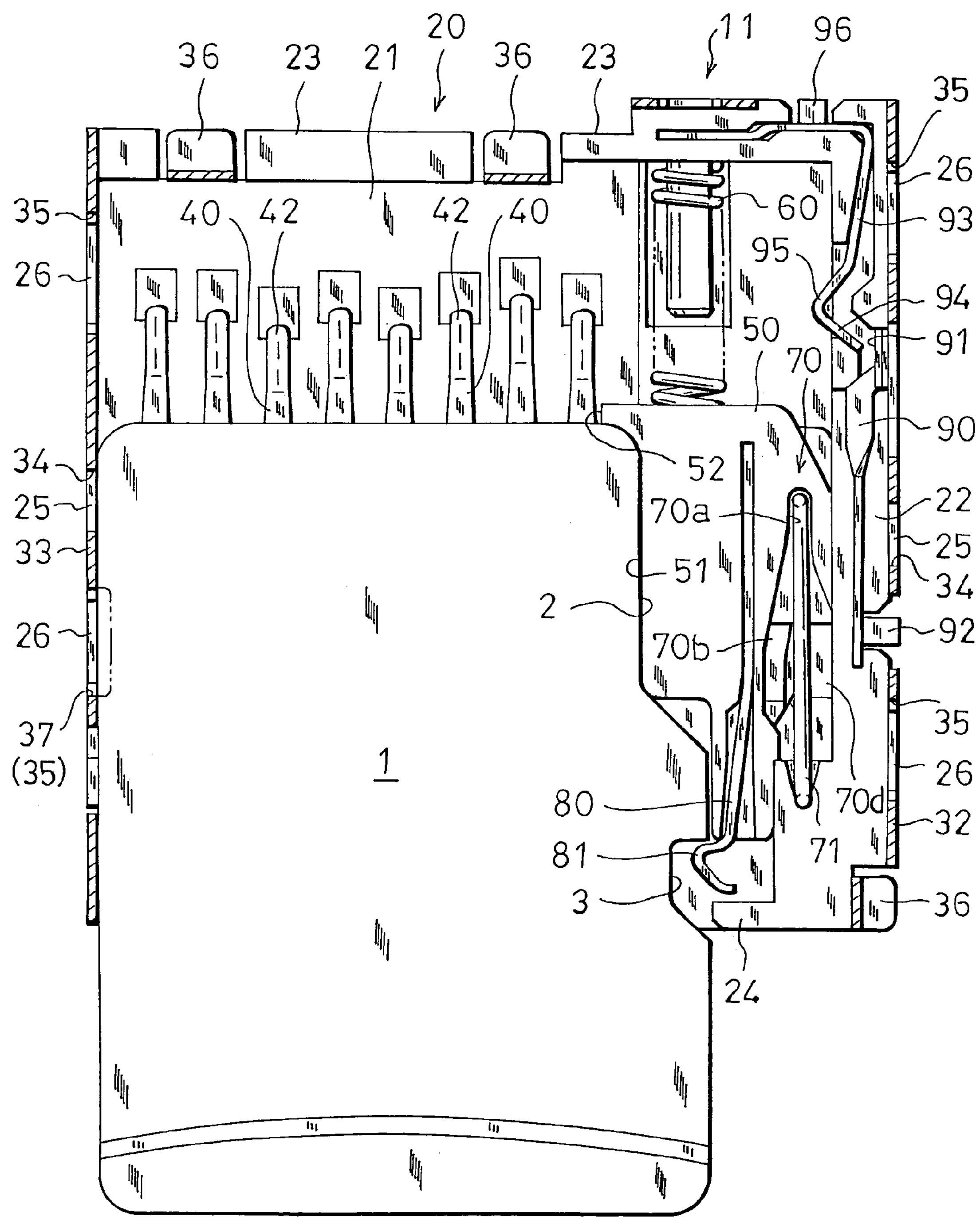
FIG. 4 is a plan view showing an initial insertion state in the case where a card is normally inserted into the card connector of the embodiment of the invention.
Figure 5:
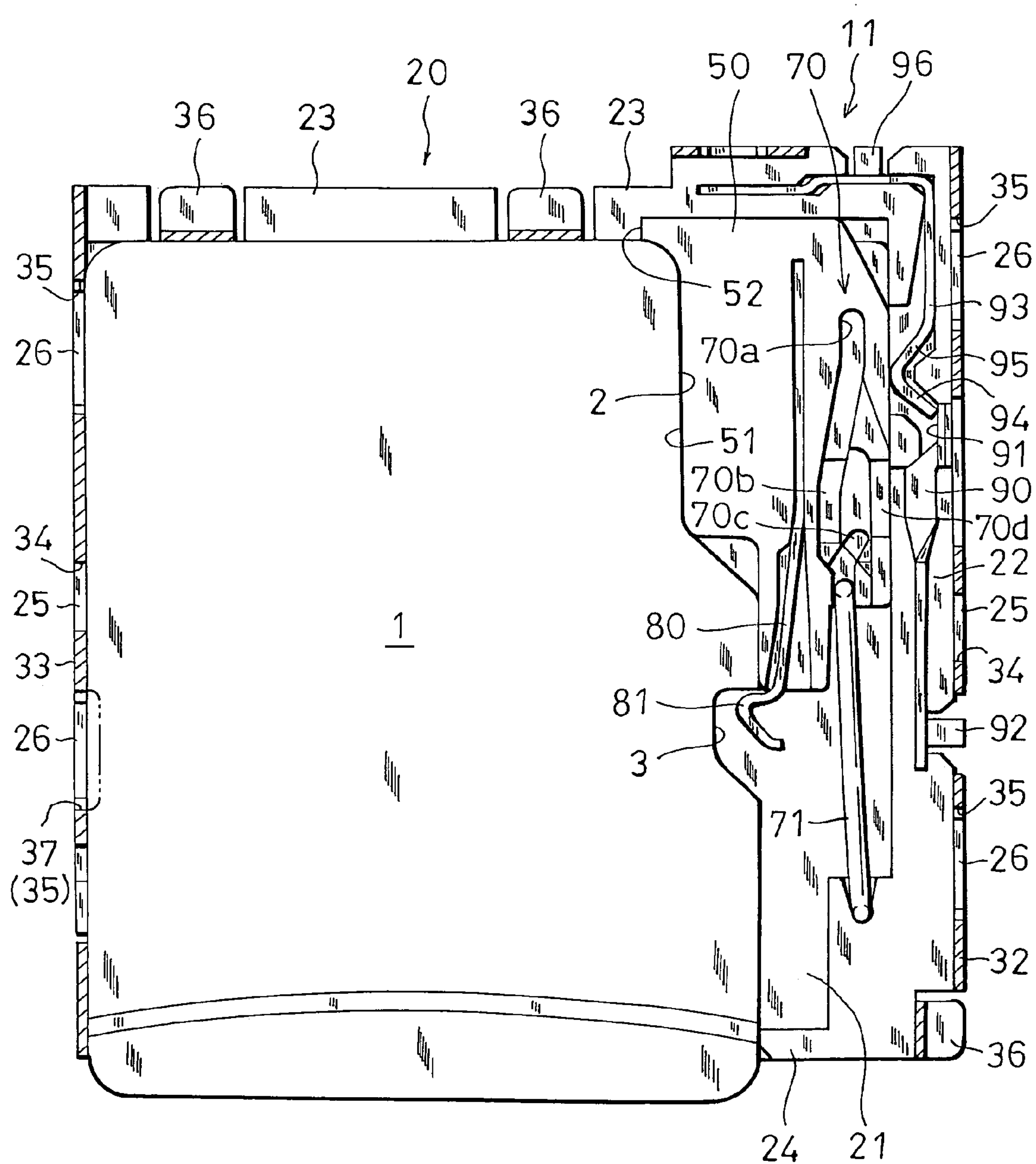
FIG. 5 is a plan view showing a state where the card is normally inserted into the card connector of the embodiment of the invention and pushed to the deepest pushed position.
Figure 6:
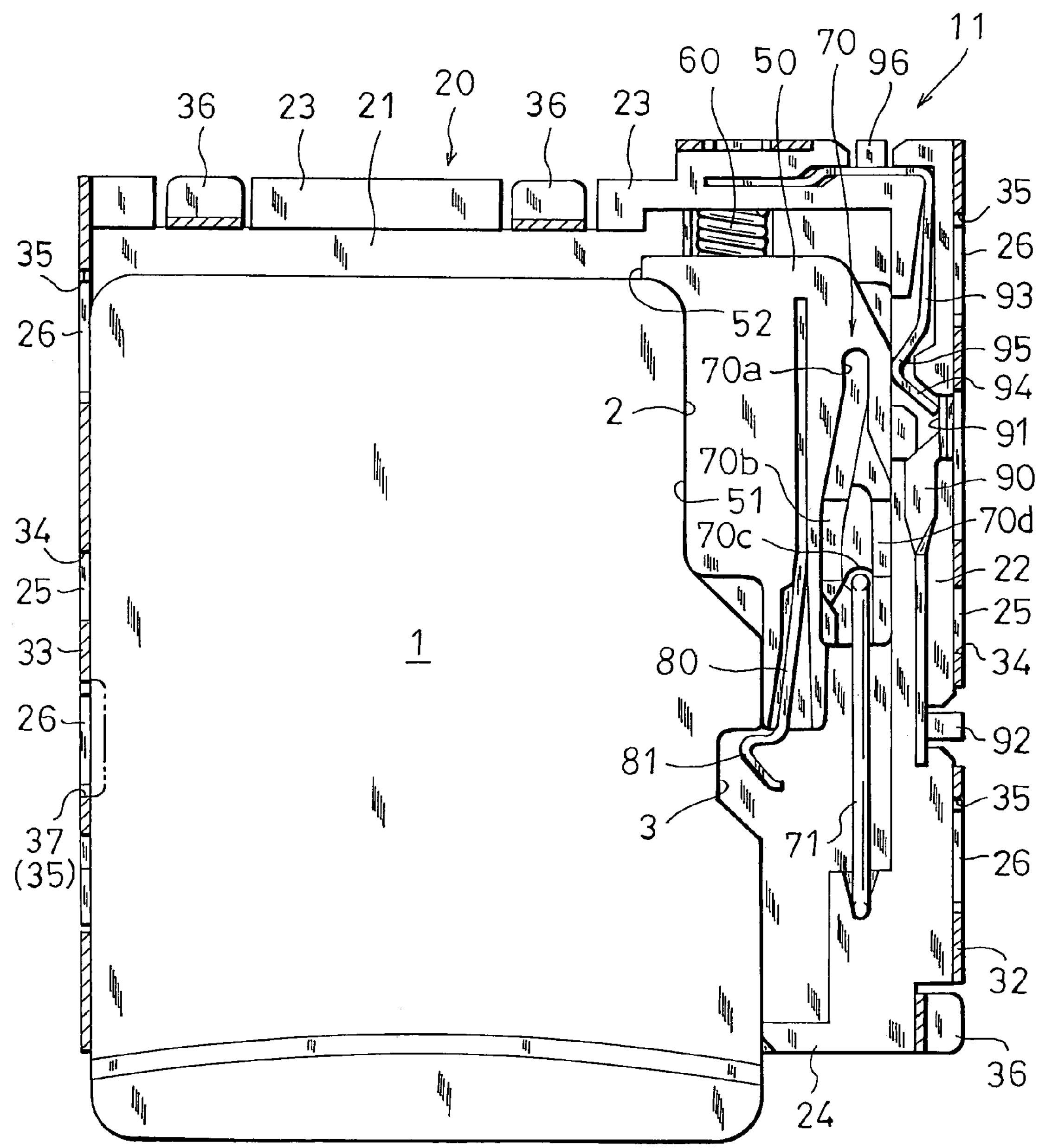
FIG. 6 is a plan view showing a state where a card is normally inserted into a card connector and attached thereto.

FIG. 4 is a plan view showing an initial insertion state in the case where the card is normally inserted into the card connector of the embodiment of the invention, FIG. 5 is a plan view showing a state where the card is normally inserted into the card connector of the embodiment of the invention and pushed to the deepest pushed position, and FIG. 6 is a plan view showing a state where the card is normally inserted into the card connector and attached thereto. As shown in FIGS. 4 to 6, when the card 1 is normally inserted or namely when, while the rear face of the card 1 is downward directed, the card is inserted through the card insertion port 10 into the interior of the housing 11 with starting from the small-width tip end portion of the card 1, the cutaway portion 2 of the card 1 is positioned in the side (right side) of the sliding member 50 in the housing 11, and the small-width tip end portion of the card 1 is fitted between the projecting portion 51 of the sliding member 50 and the left side wall portion 33 until the tip end face of the card 1 butts against the receiving portion 52 of the sliding member 50 while the projecting portion 51 of the sliding member 50 is fitted into the cutaway portion 2 of the card 1. In an initial stage of the card inserting process, when the cutaway portion 2 of the card l passes over the engagement portion 81 of the half-lock spring 80, the engagement portion 81 of the half-lock spring 80 overrides the side face of the card 1 between the cutaway portion 2 and the engagement groove 3 while involving elastic displacement of the half-lock spring 80 toward the outside (right side), and, at a substantially same timing as that where the receiving portion 52 of the sliding member 50 receives the card 1 by means of butting against the tip end portion of the card 1, the engagement groove 3 of the card 1 is opposed to the engagement portion 81 of the half-lock spring 80, and the engagement portion 81 of the half-lock spring 80 is fitted into the engagement groove 3 while involving elastic restoration of the half-lock spring 80 toward the inner side (left side). As a result, the card 1 and the sliding member 50 are engaged with each other in the card insertion/extraction direction, and half-locking is applied to the card 1 (see FIG. 4).

When the card 1 is further inserted from the state of the initial stage of the card inserting process into an inner portion of the housing 11, the receiving portion 52 of the sliding member 50 is pushed in the card insertion direction (rearward) by the tip end face of the card 1, and the sliding member 50 is pushed into the inner side of the housing 11 against the urging force of the coil spring 60 while following the insertion of the card 1. As a result, the card 1 is pushed to the maximumly pushed position where the tip end face butts against the rear side wall portion 23, and the sliding member 50 is pushed to the maximumly pushed position or the movement end position in the card insertion direction where the rear end face butts against the rear side wall portion 23 (see FIG. 5).

When the force of pushing the card 1 is cancelled in the maximumly pushed state, the sliding member 50 is pushed back in the card ejection direction from the maximumly pushed position by the urging force of the coil spring 60. In accordance with this operation, also the card 1 is pushed back in the card ejection direction from the maximumly pushed position. As a result of the series of operations of the sliding member 50 from the initial position, the other-end bent portion of the cam pin 71 is moved from the one-end starting portion 70*a* of the cam groove 70 to pass through a forward path 70*b*, and then introduced in and engaged with an other-end engagement portion 70*c*, whereby the movement of the sliding member 50 in the card ejection direction is restricted at a card attachment position which is slightly in front of the maximumly pushed position, and the sliding member 50 is locked to the housing body 20. As a result, the card 1 which is engaged in the card insertion/extraction direction with the sliding member 50 is held to the card attachment position, and the contact terminals 4 of the card 1 are contacted with and held by the contact portions 42 of the contacts 40 to be electrically connected thereto, thereby attaining a card attachment state (see FIG. 6).

In the card attachment state, the apparatus-side electronic circuit and the electronic circuit incorporated in the card 1 are electrically connected to each other through the contacts 40, and signals can be sent and received between the circuits.

When the operation of pushing the card 1 is performed in the card attachment state, both the card 1 and the sliding member 50 are again pushed to the maximumly pushed position. Because of the operation of the sliding member 50, the other-end bent portion of the cam pin 71 escapes from the engagement portion 70*c* of the cam groove 70, and is then introduced in a return path 70*d* to cancel the locking of the sliding member 50 at the card attachment position. When the force of pushing the card 1 is canceled at this timing, the sliding member 50 is pushed back in the card ejection direction from the maximumly pushed position to the initial position by the urging force of the coil spring 60, and the card 1 which is engaged in the insertion/extraction direction with the sliding member 50 is ejected to be held at the initial insertion position. When, in the card 1 ejected to the initial insertion position, an end portion protruding from the card insertion port 10 to the outside of the housing 11 is nipped by fingers and pulled, the engagement portion 81 of the half-lock spring 80 escapes from the engagement groove 3 the card 1 while involving elastic displacement of the half-lock spring 80 toward the outside and overrides the side face of the card 1 between the cutaway portion 2 and the engagement groove 3, to cancel the half-locking of the card 1, thereby allowing the card to be pulled out from the interior of the housing 11 through the card insertion port 10.

FIG. 7 is a plan view showing an initial insertion state in the case where a card is erroneously inserted in an inverted surface and rear face relationship into the card connector of the embodiment of the invention. As shown in FIG. 7, when the card 1 is erroneously inserted in an inverted surface and rear face relationship, or namely when, while the rear face of the card 1 is upward directed, the card is inserted through the card insertion port 10 into the interior of the housing 11 with starting from the small-width tip end portion of the card 1, the cutaway portion 2 of the card 1 is positioned in the side (left side) opposite to the sliding member 50 in the housing 11. Therefore, the tip end face in the edge of the tip end portion of the card 1 on the side (right side) opposite to the cutaway portion 2 butts against the front end face of the projecting portion 51 of the sliding member 50, and is caught thereby. By contrast, a gap is formed between the side (left side) of the tip end portion of the card 1 on the side of the cutaway portion 2, and the left side wall portion 33. In this state, the card 1 cannot straightly push the sliding member 50 toward the inner side of the housing 11, and the edge of the tip end portion of the card 1 on the side (right side) opposite to the cutaway portion 2 obliquely slips off toward the left side between the projecting portion 51 of the sliding member 50 and the left side wall portion 33. As a result, the card 1 is shifted toward the left side so as to eliminate the gap, and the whole card is inclined.

As described above, when the card 1 is erroneously inserted in an inverted surface and rear face relationship and inclined so as to eliminate a gap which is formed by the cutaway portion 2 of the card 1 positioned in the side opposite to the sliding member 50 in the housing 11, the edge of the tip end portion of the card 1 on the side of the cutaway portion 2 is fitted into the through hole 37 which is opened at a position that is close to the front side in the left side wall portion 33. Therefore, the tip end face of the edge of tip end portion of the card 1 on the side of the cutaway portion 2 is engaged with the rear edge of the opening of the through hole 37 in the card insertion direction, thereby blocking insertion of the card 1 in the initial stage of the card inserting process.

Consequently, the card 1 is not inserted while maintaining the inclined state. Therefore, it is possible to prevent the card 1 from biting into the housing 11 in state where the edge of the tip end portion of the card 1 on the side the cutaway portion 2 is pressed against the left side wall portion 33, and the side face portion of the card 1 opposite to the cutaway portion 2 is pressed against the opening edge (right edge) of the card insertion port 10 on the side of the sliding member 50. Furthermore, a situation where even a side face portion of the card 1 on the side of the cutaway portion 2 is pressed against an opening edge (left edge) of the card insertion port 10 opposite to the sliding member 50, and the card 1 bites into the card insertion port 10 of the housing 11 can be prevented from occurring.

Even when the card 1 is erroneously inserted in an inverted surface and rear face relationship and inclined, the card 1 does not bite into the housing 11, and damages caused on the card 1 and the card connector can be suppressed to a minimum level. Furthermore, the card 1 can be easily pulled out from the housing 11 without applying a substantial force.

When the card 1 is normally inserted as described above, the cutaway portion 2 of the card 1 is positioned on the side of the sliding member 50 in the housing 11. After the timing when the inserting process is started, therefore, the side face portion of the tip end portion of the card 1 opposite to the cutaway portion 2 is in sliding contact with the inner side face of the left side wall portion 33, and, after the initial stage of the inserting process immediately after start of insertion, the side face portion of the tip end portion of the card 1 on the side of the cutaway portion 2 is in sliding contact with the inner side face of the projecting portion 51 of the sliding member 50, thereby straightly inserting and guiding the card 1 in the card insertion direction. Therefore, the edge of the tip end portion of the card 1 opposite to the cutaway portion 2 is not fitted into the through hole 37, and normal card insertion/extraction can be performed while the through hole 37 does not adversely affect the card 1 which is normally inserted.

The through hole 37 into which, when the card 1 is normally inserted, the edge of the tip end portion of the card 1 opposite to the cutaway portion 2 is not surely fitted, and into which, in the case where the card 1 is erroneously inserted in an inverted surface and rear face relationship, and the card 1 is inclined so as to eliminate a gap which is formed by the cutaway portion 2 of the card 1 positioned in the side opposite to the sliding member 50 in the housing 11, the edge of the tip end portion of the card 1 on the side the cutaway portion 2 is fitted is most surly and preferably to be opened at a position which is opposed to the front end of the projecting portion 51 of the sliding member 50 in the left side wall portion 33.

The erroneous insertion preventing means for, when the card 1 is erroneously inserted as described above in an inverted surface and rear face relationship and inclined so as to eliminate a gap which is formed by the cutaway portion 2 of the card 1 positioned in the side opposite to the sliding member 50 in the housing 11, engaging with the edge of the tip end portion of the card 1 on the side of the cutaway portion 2 to block insertion of the card 1 is configured by the through hole 37 which is opened at the position that is close to the card insertion port 10 in the side face portion of the housing 11 opposite to the sliding member 50, i.e., the position that is close to the front side in the left side wall portion 33.

Unlike a groove in which one end is closed, there arises no disadvantage that, when the depth is shallow, sure engagement cannot be obtained, and, in order to increase the depth and obtain sure engagement, the side face portion of the housing opposite to the sliding member must be thickened, thereby causing the size of the card connector to be increased.

The side face portion in which the through hole 37 is disposed, and which is in the housing 11 opposite to the sliding member 50 is formed by the left side wall portion 33 of the metal-made cover 30 which covers the resin-made housing body 20. Therefore, the card 1 is received by the opening edge of the through hole 37, i.e., the metal fracture surface. Even when the portion for receiving the card 1 has a small area, it is possible to obtain sufficient strength.

The through hole 37 functions also as the engagement hole 35 for fixing the cover 30 to the housing body 20, i.e., fixing means. Therefore, the card 1 is received by the portion where the housing body 20 and the cover 30 are coupled with each other, i.e., a mechanically strong portion of the housing 11, and hence the housing 11 is not deformed.

What is claimed is:

1. A card connector for a card to be inserted having a tip end, a cutaway portion on one end side of the tip end, and an inverted surface, comprising:

a housing having a side face portion and a card insertion port;

a sliding member having a projecting portion which fits into the cutaway portion of the card, and which is movable in a card insertion/extraction direction relative to said housing; and erroneous insertion preventing means, disposed at a position on said side face portion of said housing opposite to said sliding member, wherein:

when the card is inserted in said housing with its inverted surface facing upwardly and inclined so that the cutaway portion does not engage said sliding member, the card engages said erroneous insertion preventing means; and said side face portion of said housing in which said erroneous inserting preventing means is disposed, and which is opposite to said sliding member is formed by a metal-made cover which covers a resin-made housing body.

2. A card connector for a card to be inserted therein, having a tip end, a cutaway portion on one end side of the tip end, and an inverted surface, comprising:

a housing having a side face portion and a card insertion port into which the card is inserted;

a sliding member on one side of said housing, said sliding member having a projecting portion which fits into the cutaway portion of the card, and which is movable in a card insertion/extraction direction relative to said housing; and erroneous inserting preventing means, disposed at a position on said side face portion of said housing opposite to said sliding member, which block insertion of the card when being erroneously inserted in an upside-down orientation and inclined so as to eliminate a gap, which is formed by said cutaway portion on a side of said housing opposite said sliding member wherein:

said erroneous inserting preventing means are disposed at a side face portion of said housing opposite said sliding member and said card insertion port; and said erroneous inserting preventing means engage with an edge of a tip end portion of the card on a side of said cutaway portion of the card upon erroneous insertion thereof when the card is inserted in said housing with its inverted surface facing upwardly and inclined so that the cutaway portion does not engage said sliding member, the card engages said erroneous inserting preventing means.

3. The card connector according to claim 2, wherein:

said erroneous insertion preventing means are configured by a through hole in said side face portion of said housing into which said edge of said tip end portion of said card is to be fitted.

4. The card connector according to claim 2, wherein:

said side face portion of said housing is formed by a metal cover, which covers a resin made housing body.

5. The card connector according to claim 3, wherein:

said side face portion of said housing is formed by a metal cover, which covers a resin made housing body.

6. The card connector according to claim 4, wherein:

the metal cover is fixed to the resin made housing body by engagement claws, which are disposed at left and right sides of said housing body, said engagement claws fitting into engagement holes formed by through holes, which are disposed on left and right side of said cover.

7. The card connector according to claim 5, wherein:

said erroneous insertion preventing means configured by a through hole in said side face portion of said metal cover function also as an engagement hole.

* * * * *